(12) United States Patent
Fu et al.

(10) Patent No.: US 12,617,275 B2
(45) Date of Patent: May 5, 2026

(54) SYMMETRIC HUMAN-MACHINE INTERFACE FOR HYBRID VEHICLE CONTROL

(71) Applicants: Hyundai Motor Company, Seoul (KR); Kia Corporation, Seoul (KR)

(72) Inventors: Ernestine Fu, Somerville, MA (US); John Suh, Palo Alto, CA (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 379 days.

(21) Appl. No.: 18/302,872

(22) Filed: Apr. 19, 2023

(65) Prior Publication Data

US 2024/0351597 A1 Oct. 24, 2024

(51) Int. Cl.

| | |
|---|---|
| *B60W 50/08* | (2020.01) |
| *B60K 35/22* | (2024.01) |
| *B60K 35/28* | (2024.01) |
| *B62D 57/028* | (2006.01) |
| *G05D 1/00* | (2006.01) |
| *G06F 3/0482* | (2013.01) |
| *G06F 3/0484* | (2022.01) |
| *B60K 35/10* | (2024.01) |
| *B60W 50/00* | (2006.01) |

(52) U.S. Cl.
CPC .............. *B60K 35/22* (2024.01); *B60K 35/28* (2024.01); *B60W 50/08* (2013.01); *B60W 50/082* (2013.01); *B62D 57/028* (2013.01); *G05D 1/0011* (2013.01); *G06F 3/0482* (2013.01); *G06F 3/0484* (2013.01); *B60K*

*35/10* (2024.01); *B60K 2360/11* (2024.01); *B60W 2050/0075* (2013.01); *B60W 2300/185* (2013.01)

(58) Field of Classification Search
CPC .... B60K 35/10; B60K 2360/11; B60K 35/00; B60W 2050/0075; B60W 2300/185; B60W 50/082; B60W 50/08; B62D 57/028; G06F 3/0482; G06F 3/0484
See application file for complete search history.

(56) References Cited

U.S. PATENT DOCUMENTS 9,862,090 B2 1/2018 Kennedy et al.
12,179,337 B2 * 12/2024 Gillett ..................... B25J 9/162
(Continued)

FOREIGN PATENT DOCUMENTS

| | | |
|---|---|---|
| JP | 2014-087892 A | 5/2014 |
| JP | 2022-067781 A | 5/2022 |
| WO | 2021/025715 A1 | 2/2021 |

*Primary Examiner* — Anil K Bhargava
(74) *Attorney, Agent, or Firm* — Fox Rothschild LLP

(57) ABSTRACT

Systems and methods for operating a hybrid vehicle are provided. The method may comprise receiving, at a human-machine interface (HMI), a selection of at least one hybrid vehicle of a plurality of hybrid vehicles. The HMI may comprise a processor and a memory, and each hybrid vehicle, of the plurality of hybrid vehicles, may be configured to perform wheeled and walking locomotion. The method may further comprise rendering, at the HMI, a graphical user interface (GUI) based on the selection of the at least one hybrid vehicle, and receiving, at the HMI, one or more commands. The one or more commands may be configured to dictate an operation of one or more hybrid vehicles of the selection of the at least one hybrid vehicle.

12 Claims, 13 Drawing Sheets

(56)                    References Cited

U.S. PATENT DOCUMENTS

| | | | | |
|---|---|---|---|---|
| 2011/0130905 A1* | 6/2011 | Mayer | .................... | G07C 5/008 |
| | | | | 340/439 |
| 2016/0023352 A1* | 1/2016 | Kennedy | ................ | B25J 9/0087 |
| | | | | 901/30 |
| 2016/0318505 A1* | 11/2016 | Aoki | ..................... | B60W 10/08 |
| 2020/0216127 A1* | 7/2020 | Suh | ......................... | B25J 18/02 |
| 2020/0298821 A1* | 9/2020 | Oh | ........................ | B60W 10/08 |
| 2021/0283783 A1* | 9/2021 | Gillett | ................. | G05D 1/0088 |
| 2022/0114690 A1* | 4/2022 | Petroff | ................. | G05D 1/0291 |
| 2023/0390937 A1* | 12/2023 | Fukabori | ............. | G05D 1/0038 |
| 2024/0300474 A1* | 9/2024 | Chiba | .................. | B60W 20/12 |

* cited by examiner

600

SYMMETRIC HUMAN-MACHINE INTERFACE FOR HYBRID VEHICLE CONTROL

BACKGROUND

Technical Field

Embodiments of the present disclosure relate to systems and methods for controlling a vehicle capable of locomotion using both walking motion and rolling traction using a human-machine interface.

Background

Conventional passenger motor vehicles are designed to primarily move in a forward direction using wheeled locomotion. These conventional motor vehicles are typically controlled using a steering wheel to control the direction of travel of the vehicle and two (or three) foot pedals to control acceleration and braking (and shifting gears in a manual transmission). While innovation in the automobile industry has changed the driving experience, control of vehicles using a steering wheel and standard foot pedals has not fundamentally changed since the mass-production of automobiles.

New motor vehicles capable of wheeled and walking motion, such as, e.g., the Hyundai Elevate, will be capable of omnidirectional movement (e.g., being able to perform in a walking mode). Current user interfaces for controlling conventional motor vehicles are not able to provide control for such new vehicles. With the advent of an automobile capable of omnidirectional travel (e.g., a walking vehicle), driving controls must be reimagined to provide operator control of the new vehicular functionality.

It is envisioned that such walking vehicles may be remotely controlled or may have passengers with an onboard operator. Moreover, it is possible that multiple walking vehicles may perform collective operations, possibly under the control of one remote or onboard operator. Given the wide range of possible use cases and control possibilities, the driving controls should be reimagined to efficiently and intuitively allow for such varied control options.

SUMMARY

According to an object of the present disclosure, a method for operating a hybrid vehicle is provided. The method may comprise receiving, at a human-machine interface (HMI), a selection of at least one hybrid vehicle of a plurality of hybrid vehicles. The HMI may comprise a processor and a memory, and each hybrid vehicle, of the plurality of hybrid vehicles, may be configured to perform wheeled and walking locomotion. The method may further comprise rendering, at the HMI, a graphical user interface (GUI) based on the selection of the at least one hybrid vehicle, and receiving, at the HMI, one or more commands. The one or more commands may be configured to dictate an operation of one or more hybrid vehicles of the selection of the at least one hybrid vehicle.

According to an exemplary embodiment, the method may further comprise receiving, at another instance of the HMI, a command to switch an operator of the at least one hybrid vehicle to another operator. The other instance of the HMI may comprise a processor and a memory.

According to an exemplary embodiment, the method may further comprise switching control of the at least one hybrid vehicle to the other operator.

According to an exemplary embodiment, the switching control of the at least one hybrid vehicle to the other operator may be contingent upon satisfaction of a control hierarchy for establishing operator control.

According to an exemplary embodiment, the method may further comprise receiving, at the HMI, a selection of a different hybrid vehicle of the at least one hybrid vehicle.

According to an exemplary embodiment, the receiving, at the HMI, the one or more commands may comprise receiving the one or more commands via one or more of: a motion control device; a display device; a data input device; and an audio device.

According to an exemplary embodiment, the method may further comprise updating the selection of the at least one hybrid vehicle to the different hybrid vehicle, and updating the GUI based on the selection of the different hybrid vehicle.

According to an exemplary embodiment, the updating the selection of the at least one hybrid vehicle may be contingent upon satisfaction of a control hierarchy for establishing operator control.

According to an object of the present disclosure, a system for operating a hybrid vehicle is provided. The system may comprise at least one hybrid vehicle. Each hybrid vehicle, of the plurality of hybrid vehicles, may be configured to perform wheeled and walking locomotion. The system may comprise a HMI, comprising a processor and a memory. The processor may be configured to receive, at the HMI, a selection of at least one hybrid vehicle of the plurality of hybrid vehicles, render, at the HMI, a graphical user interface (GUI) based on the selection of the at least one hybrid vehicle, and receive, at the HMI, one or more commands. The one or more commands may be configured to dictate an operation of one or more hybrid vehicles of the selection of the at least one hybrid vehicle.

According to an exemplary embodiment, each hybrid vehicle, of the plurality of hybrid vehicles, may comprise a chassis, a plurality of leg-wheel components coupled to the chassis, wherein the plurality of leg-wheel components are configured to be collectively operable to provide wheeled locomotion and walking locomotion, at least one sensor configured to receive one or more external commands during a supplementary control mode, and a vehicle control system configured to control a hybrid vehicle to effectuate the one or more external commands.

According to an exemplary embodiment, the system may further comprise another instance of the HMI. The other instance of the HMI may comprise a processor and a memory. The processor of the other HIM may be configured to receive a command to switch an operator of the at least one hybrid vehicle to another operator.

According to an exemplary embodiment, the processor of the other HIM may be configured to switch control of the at least one hybrid vehicle to the other operator.

According to an exemplary embodiment, the switching control of the at least one hybrid vehicle to the other operator may be contingent upon satisfaction of a control hierarchy for establishing operator control.

According to an exemplary embodiment, the processor may be further configured to receive, at the HMI, a selection of a different hybrid vehicle of the at least one hybrid vehicle.

According to an exemplary embodiment, the processor may be further configured to update the selection of the at least one hybrid vehicle to the different hybrid vehicle, and update the GUI based on the selection of the different hybrid vehicle.

According to an object of the present disclosure, a system for operating a hybrid vehicle is provided. The system may comprise at least one hybrid vehicle. Each hybrid vehicle, of the plurality of hybrid vehicles, may be configured to perform wheeled and walking locomotion. The system may comprise a HMI comprising a computing device. The computing device may comprise a processor and a memory. The computing device may be configured to store programming instructions that, when executed by the processor, cause the processor to receive, at the HMI, a selection of at least one hybrid vehicle of the plurality of hybrid vehicles, render, at the HMI, a graphical user interface (GUI) based on the selection of the at least one hybrid vehicle, and receive, at the HMI, one or more commands. The one or more commands may be configured to dictate an operation of one or more hybrid vehicles of the selection of the at least one hybrid vehicle.

According to an exemplary embodiment, each hybrid vehicle, of the plurality of hybrid vehicles, may comprise a chassis, a plurality of leg-wheel components coupled to the chassis, wherein the plurality of leg-wheel components are configured to be collectively operable to provide wheeled locomotion and walking locomotion, at least one sensor configured to receive one or more external commands during a supplementary control mode, and a vehicle control system configured to control a hybrid vehicle to effectuate the one or more external commands.

According to an exemplary embodiment, the system may comprise another instance of the HMI. The other instance of the HMI may comprise a computing device. The computing device of the other instance of the HMI may comprise a processor and a memory and may be configured to store programming instructions that, when executed by the processor, cause the processor to receive a command to switch an operator of the at least one hybrid vehicle to another operator.

According to an exemplary embodiment, the programming instructions of the computing device of the other instance of the HMI may be further configured, when executed by the processor, to switch control of the at least one hybrid vehicle to the other operator.

According to an exemplary embodiment, the programming instructions, when executed by the processor, may be further configured to receive, at the HMI, a selection of a different hybrid vehicle of the at least one hybrid vehicle.

According to an exemplary embodiment, the programming instructions, when executed by the processor, may be further configured to update the selection of the at least one hybrid vehicle to the different hybrid vehicle, and update the GUI based on the selection of the different hybrid vehicle.

BRIEF DESCRIPTION OF THE DRAWINGS

The accompanying drawings, which are incorporated in and form a part of the Description of Embodiments, illustrate various non-limiting and non-exhaustive embodiments of the subject matter and, together with the Detailed Description, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DETAILED DESCRIPTION

Figure 1A:
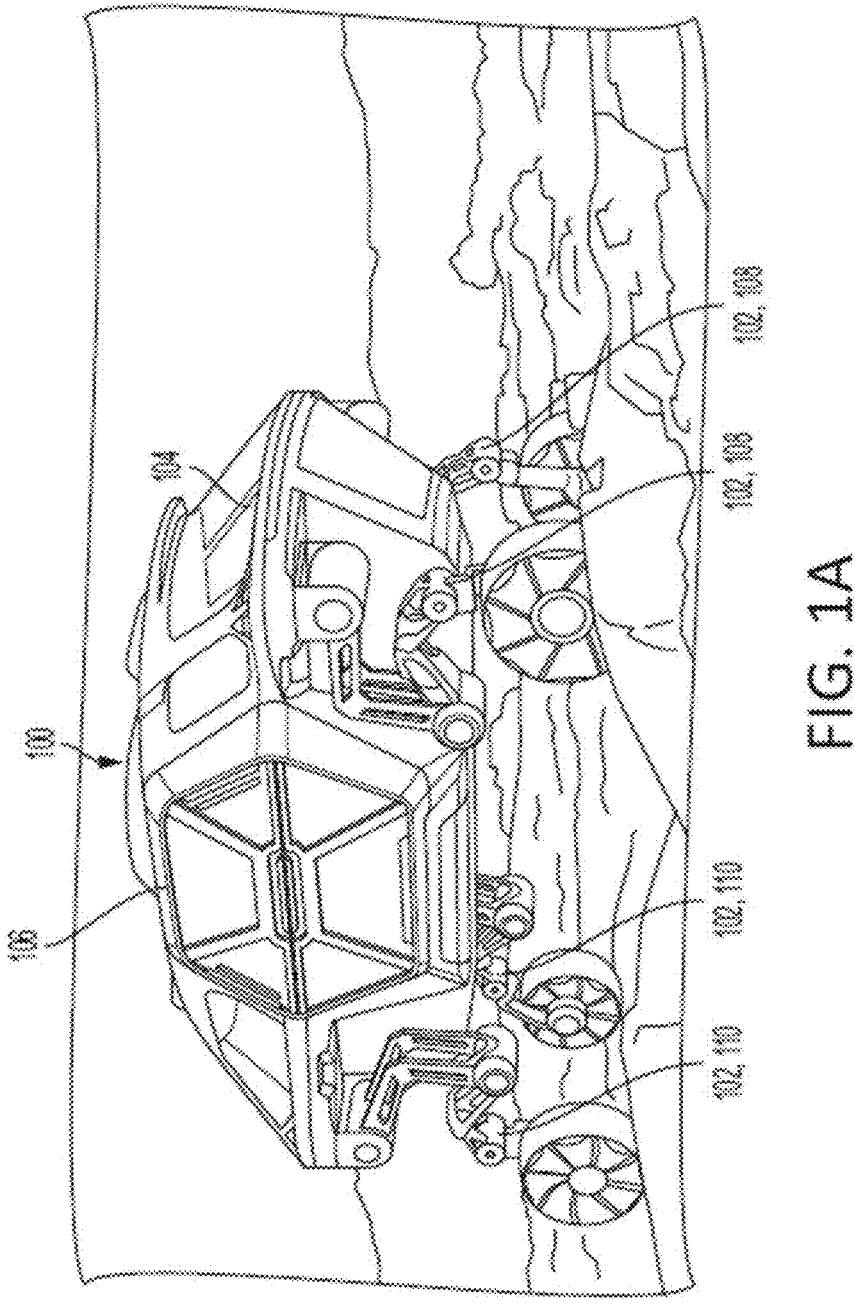
FIGS. 1A through 1C illustrate a hybrid vehicle capable of omnidirectional movement using both walking motion and rolling motion, according to an exemplary embodiment of the present disclosure.

The following Description of Embodiments is merely provided by way of example and not of limitation. Furthermore, there is no intention to be bound by any expressed or implied theory presented in the preceding background or in the following Detailed Description.

Reference will now be made in detail to various exemplary embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included within the spirit and scope the various embodiments as defined by the appended claims. Furthermore, in this Detailed Description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing, and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities may take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "communicating," "taking," "comparing," "monitoring," "calibrating," "estimating," "initiating," "providing," "receiving," "controlling," "transmitting," "isolating," "generating," "aligning," "synchronizing," "identifying," "maintaining," "displaying," "switching," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example device vibration sensing system and/or electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration. One or more components of an SPU or electronic device described herein may be embodied in the form of one or more of a "chip," a "package," an Integrated Circuit (IC).

According to an exemplary embodiment, a vehicle capable of both wheeled locomotion and walking locomotion is provided, in accordance with exemplary embodiments of the present disclosure. An example system for providing a symmetric human-machine interface (HMI) for selection and control of one or more hybrid vehicle is provided, in accordance with exemplary embodiments of the present disclosure.

Embodiments described herein provide a symmetric HMI for use in controlling one or more vehicles capable of locomotion using both walking motion and rolling traction, also referred to herein as a "hybrid vehicle." The described symmetric HMI for use in hybrid vehicle control may be configured to provide substantially the same interface for use in controlling one or more hybrid vehicles in a fleet, by one or more operators, regardless of whether the vehicles can accommodate 0, 1, or N passengers, and irrespective of whether the vehicle is piloted locally or remotely.

According to an exemplary embodiment, the hybrid vehicle of the described embodiments may have two forms; a crewed vehicle configured to carry at least one onboard operator; and an uncrewed vehicle comprising a payload capacity and configured to perform remote operation. According to an exemplary embodiment, both forms of the hybrid vehicle may be configured to perform similar physical motion and operation as legged-wheeled hybrid vehicles. Furthermore, both forms of the hybrid vehicle may be configured to have operation control modes that span from highly user controlled to fully autonomous.

According to an exemplary embodiment, a symmetric HMI is provided which may be configured to control one or more hybrid vehicles (e.g., both passenger occupied hybrid vehicles and uncrewed hybrid vehicles). According to an exemplary embodiment, only a single HMI may be needed to be developed and maintained by engineering and then learned by operators for both crewed and uncrewed hybrid vehicles. This saves engineering time as well as user training time. It is particularly useful in the context of the described hybrid vehicle configured to perform wheeled and walking locomotion in which multiple drive modes are available. It should be appreciated that the described symmetric HMI may be implemented from a very simple to a very complex HMI, provided the HMI is essentially uniform between the various points of control (e.g., in-vehicle, remote, or telepresence).

According to an exemplary embodiment, the symmetric HMI may be configured to provide an intuitive interface to quickly toggle or switch between operators for a hybrid vehicle. For a passenger hybrid vehicle, the symmetric HMI may be configured to enable an operator to disengage for part of the mission, switching to an alternative operator either in the hybrid vehicle or external to the hybrid vehicle. For an unmanned hybrid vehicle, the symmetric HMI may be configured to allow control to switch among more than one operator.

According to an exemplary embodiment, the symmetric HMI may be configured to provide an intuitive interface to quickly toggle or switch between hybrid vehicles being controlled (e.g., switching control from a first hybrid vehicle to a second hybrid vehicle). According to an exemplary embodiment, the symmetric HMI may be configured to provide an interface for undertaking group control of multiple hybrid vehicles. For example, there may be instances where multiple hybrid vehicles are collaborating on a mission, and the use of a common and symmetric HMI allows an operator to seamlessly switch control to a different vehicle or groups of hybrid vehicles within the fleet of hybrid vehicles. According to an exemplary embodiment, the symmetric HMI may be configured to provide for group control of a plurality of vehicles (e.g., unmanned aerial vehicle (UAV) flocks, unmanned ground vehicle (UGV) herds, and/or unmanned surface vehicle (USV) schools).

According to an exemplary embodiment, the symmetric HMI may be implemented within a tablet, phone, and/or other primarily touchscreen interface. In addition to the touchscreen, a camera may be used to recognize sign language commands, and/or a microphone may be used to accept voice instructions. A virtual reality headset and/or smart glasses may optionally be used to display environmental conditions and/or operating parameters. Body worn elements may be used to provide haptic feedback and/or control inputs. According to an exemplary embodiment, the symmetric HMI may be operated according to a control hierarchy for establishing operator control (e.g., which operators supersede other operators) and resolving conflicts (e.g., when multiple vehicles request one operator, or multiple operators request one vehicle).

Figure 1B:
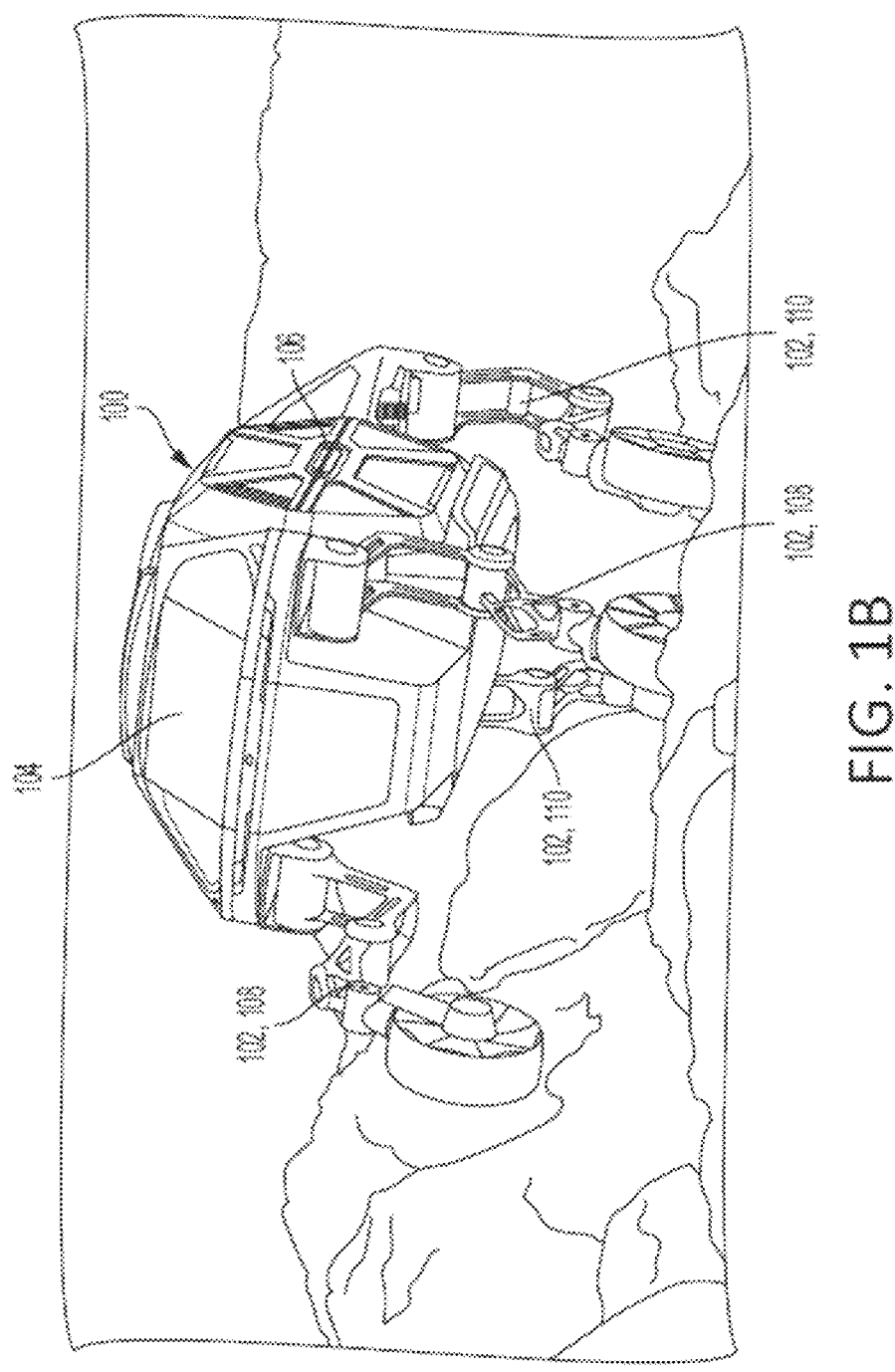
Figure 1C:
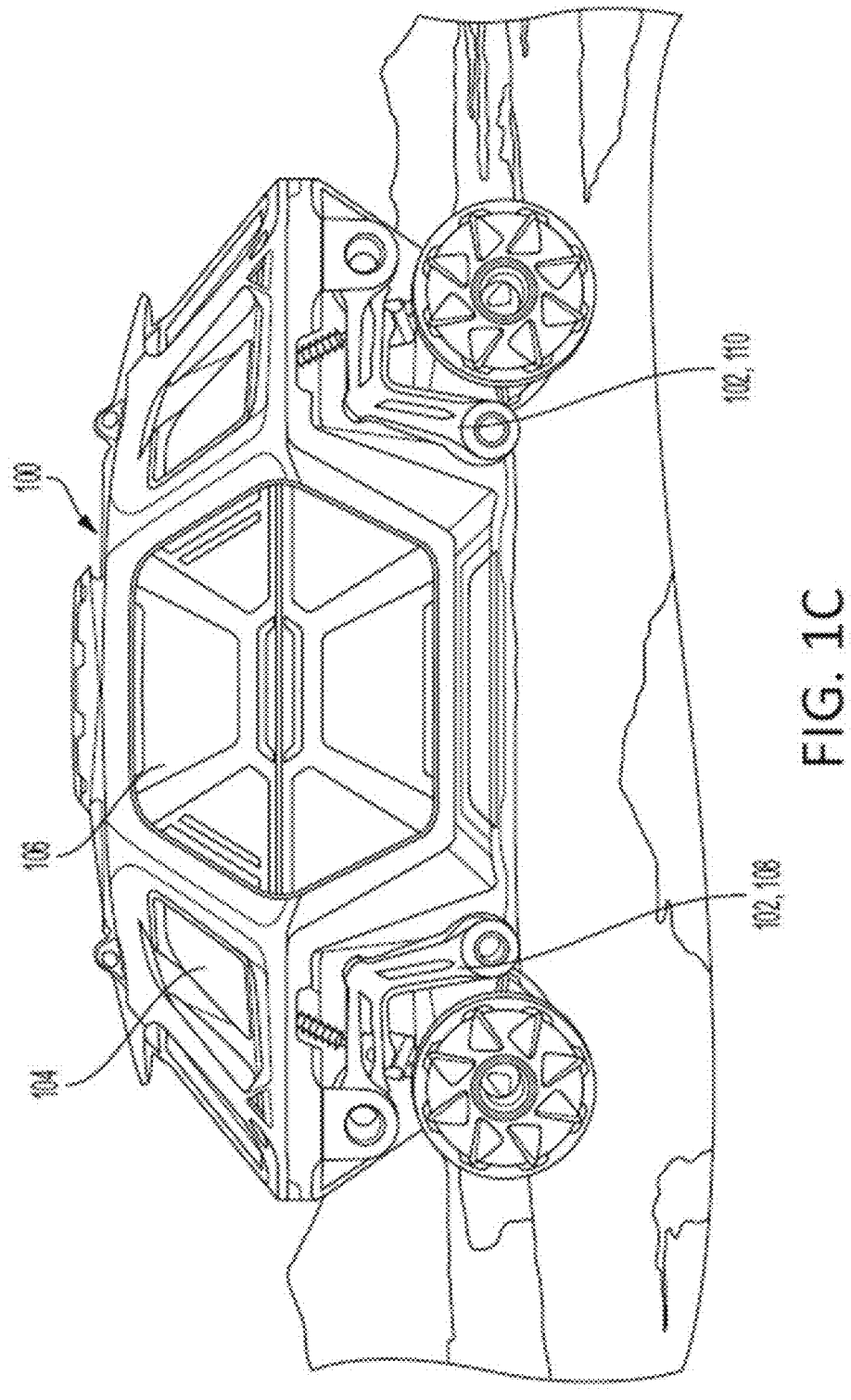

Referring now to FIGS. 1A through 1C, a hybrid vehicle 100 capable of, and configured to perform, omnidirectional movement using both walking motion and rolling motion, is illustratively depicted, according to exemplary embodiments of the present disclosure. FIGS. 1A and 1B illustrate the hybrid vehicle 100 in different walking locomotion positions across rugged terrain, where hybrid vehicle 100 is capable of omnidirectional movement. FIG. 1C illustrates a side view of hybrid vehicle 100.

Hybrid vehicle 100 may comprise four leg-wheel components 102, each configured to perform movement with at least two degrees of freedom. It is noted, however, that other numbers of leg-wheel components 102 may be incorporated, while maintaining the spirit and functionality of the present disclosure. As illustrated, hybrid vehicle 100 may comprise a passenger compartment 104 configured to hold one or more people. It should be appreciated that hybrid vehicle 100, in some exemplary embodiments, may be configured to be operated by an onboard operator, may be configured to be operated remotely, and/or may be configured to be operated autonomously.

In an exemplary embodiment, the leg-wheel components 102 may be configured to perform movement with at least six degrees of freedom. It should be appreciated that, while the leg-wheel components 102 may be configured to be controlled collectively in order to provide rolling and walking locomotion, each leg-wheel component 102 may be capable of performing different movement or positioning, from the one or more other leg-wheel components 102, during operation. For example, while using wheeled locomotion on an upward slope, in order to maintain a body 104 and chassis 106 of the hybrid vehicle 100 level with flat ground, the front leg-wheel components 108 may be retracted and the rear leg-wheel components 110 may be extended. In an exemplary embodiment, while using walking locomotion to traverse rough terrain, each leg-wheel component 102, or opposite pairs of the leg-wheel components 102 (e.g., front left and rear right), may be configured to move differently from the other leg-wheel components 102. The leg-wheel components 102 may be configured to operate to move the hybrid vehicle 100 in any direction of travel, and may be configured to change direction(s) at any time.

Various aspects of control for the hybrid vehicle 100 may be controlled by either an operator and/or the hybrid vehicle 100 itself, depending on the operation mode. In general, a number of aspects of the operation may be subject to different types of operator control. For example, aspects that may be controlled in operating the hybrid vehicle 100 may comprise one or more objectives of the hybrid vehicle 100, one or more destinations of the hybrid vehicle 100, a speed and direction of travel, a type of locomotion used (e.g., wheeled, walking, and/or a combination), the position of one or more leg-wheel components 102 when in walking locomotion, controlling the walking gait when in walking locomotion, etc. Moreover, in controlling the operation of a hybrid vehicle 100, different vehicle operation modes are described that may afford different types of operation to the hybrid vehicle 100 operator. In general, the vehicle operation modes may be configured to cover modes in which an onboard operator is in complete control of vehicle operation to modes in which an operator (onboard or remote) may provide the hybrid vehicle 100 with objectives that the hybrid vehicle 100 may interpret, which the hybrid vehicle 100 may then implement to accomplish the objectives.

Figures 2A, 2B:
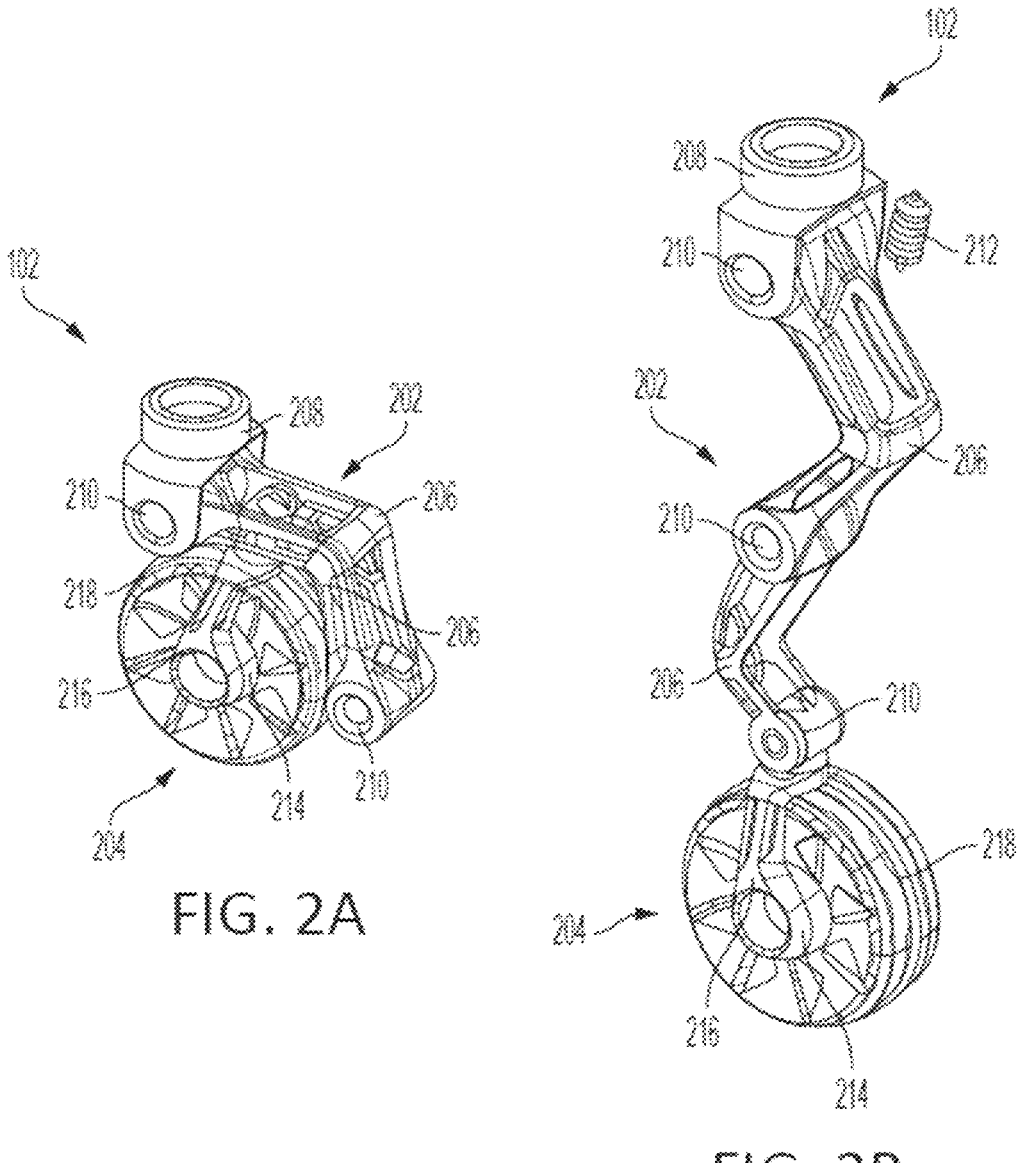
FIGS. 2A and 2B illustrate a leg-wheel component in retracted and extended positions, according to an exemplary embodiment of the present disclosure.

Referring now to FIGS. 2A and 2B, an example leg-wheel component 102 in a retracted position (FIG. 2A) and an extended position (FIG. 2B), are illustratively depicted, in accordance with an exemplary embodiment of the present disclosure.

Various embodiments of such leg-wheel components 102 are described, e.g., in co-pending U.S. patent application Ser. No. 16/734,310 (U.S. Patent Application Publication No. 2020/0216127). It is noted that other configurations of one or more leg-wheel components 102 may be incorporated into the present disclosure, while maintaining the spirit and functionality of the present disclosure.

The leg-wheel component 102 may comprise a leg component 202 and a wheel component 204. The wheel component 204 may be coupled to the leg component 202.

According to an exemplary embodiment, the leg-wheel component 102 may comprise a coupling component 208 configured to couple the leg-wheel component 102 to the body 104, frame, or other suitable component of the hybrid vehicle 100.

The leg component 202 may be divided into one or more segments 206. The one or more segments 206, coupling component 208, and/or the wheel component 204 may be configured to rotate about each other via one or more movable joint components 210. According to an exemplary embodiment, the leg-wheel component 102 may comprise one or more suspension systems 212 (e.g., springs, shock absorbers, etc).

According to an exemplary embodiment, the wheel component 204 may be configured to rotate along an axis while coupled to the leg component 202, enabling the hybrid vehicle 100 to move along a surface in contact with the wheel component 204. According to an exemplary embodiment, the leg-wheel component 102 may comprise one or more braking mechanisms for preventing and/or decreasing rotation of the wheel component 204.

With reference to FIG. 2A, the leg-wheel component 102 (a hybrid vehicle 100 traversal component) is in a retracted state, with the leg-wheel component 102 being configured and positioned to provide wheeled locomotion. With reference to FIG. 2B, the leg-wheel component 102 is in an extended state, with the leg-wheel component 102 being configured and positioned to provide walking locomotion and/or wheeled locomotion.

According to an exemplary embodiment, wheeled locomotion may be available for use in situations where traditional vehicle travel using rolling wheels 204 is available (e.g., roads and highways). Wheeled locomotion is efficient, when available, for conveyance of a vehicle (e.g., hybrid vehicles 100, 300, 412) between destinations. According to some exemplary embodiments, the leg-wheel components 102 may be configured to allow for active height adjustment of the hybrid vehicle 100, enabling the hybrid vehicle 100 to go, e.g., from street use to off-road use.

In walking locomotion, the hybrid vehicle 100 may be configured to walk up elevations and terrain that is not surmountable using wheeled locomotion. In some instances, walking locomotion allows for nimble and quiet motion, relative to wheeled locomotion. The hybrid vehicle 100 may also be configured to move laterally, allowing for quadrupedal ambulation.

According to an exemplary embodiment, the leg-wheel component 102 comprises one or more in-wheel motors 214 configured to power movement of the wheel component 204 and/or the leg component 202. The use of in-wheel motors 214 frees the suspension 212 from traditional axles and allows for ambulation, but also increases the driving performance and adaptability.

By using the wheels 204 as feet, the electric motors 214 may be configured to lock for stable ambulation, but also may have slow torque controlled rotation for micro movements when climbing or during self-recovery. According to some exemplary embodiments, the wheel 204 of the leg-wheel component 102 may be configured to rotate 180 degrees perpendicular to a hub 216, not only allowing leaning capability while driving, but also giving the wheels 204 enhanced positioning potential when a tire 218 is locked and in walking mode. The wheel 204 may be configured to turn 90 degrees and even may be configured to be used as a wide foot pad, lowering the hybrid vehicle's 100 pounds per square inch (PSI) footprint when walking over loose materials or fragile surfaces, similar to that of a snowshoe.

Figure 2C:
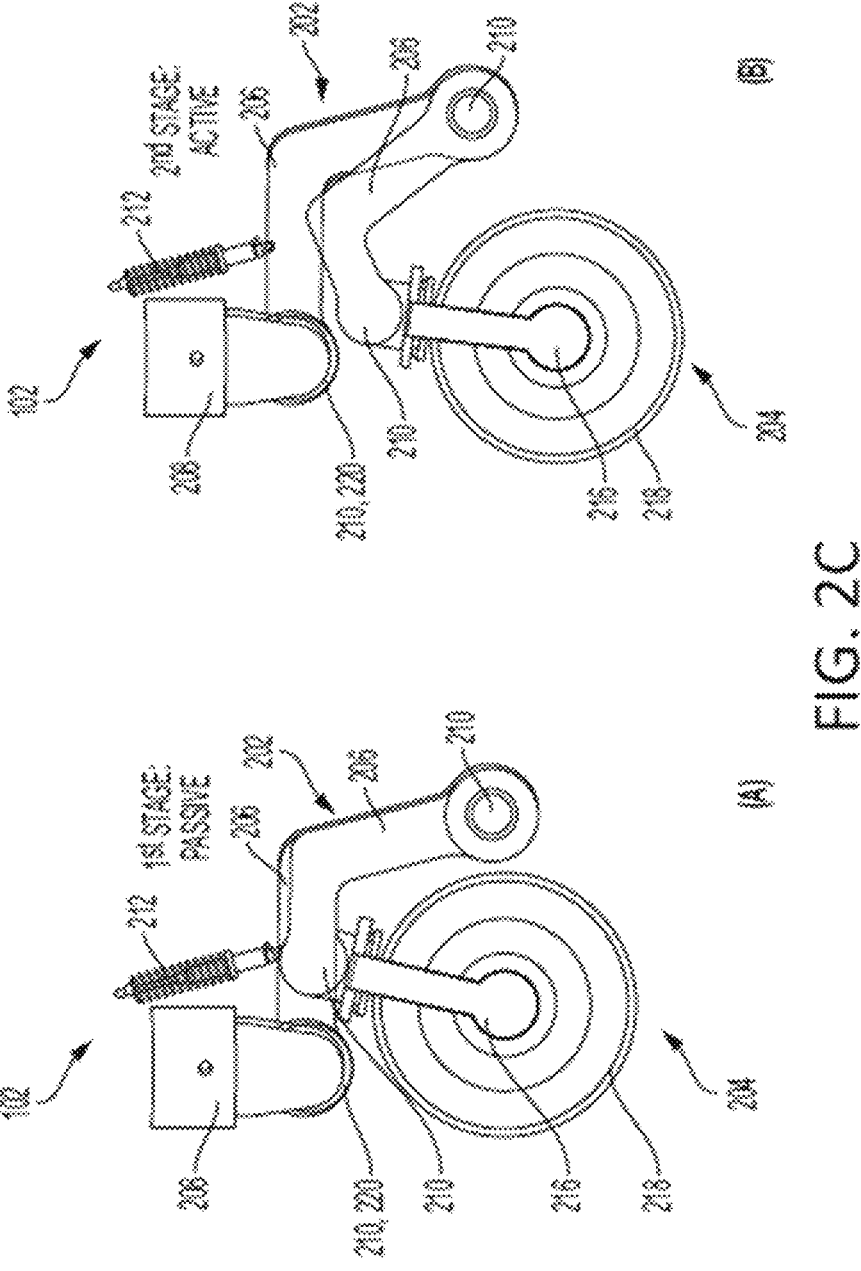
FIG. 2C is a diagram illustrating a low range of motion suspension stage and a high range of motion suspension stage, according to an exemplary embodiment of the present disclosure.

Referring now to FIG. 2C, a diagram indicating a low range of motion suspension stage ((A), a passive stage), and a high range of motion suspension stage ((B), an active stage) of a leg-wheel component 102 is illustratively depicted, in accordance with an exemplary embodiment of the present disclosure.

A hybrid vehicle (e.g., 100, 300, 412) traversal component (also referred to herein as a "leg-wheel component" 102) is provided. According to an exemplary embodiment, the leg-wheel component 102 may be configured to provide two-stage suspension: a first, low range of motion suspension stage, when the leg-wheel component 102 of the hybrid vehicle 100 is in a retracted position (A), and a second, high range of motion suspension stage, when the leg-wheel component 102 of the hybrid vehicle 100 is in an extended position (B).

According to an exemplary embodiment, in the low range of motion suspension stage, the suspension system 212 (e.g., a coil-over suspension) is utilized and engaged when the leg-wheel component 102 of the hybrid vehicle 100 is in the retracted position. According to an exemplary embodiment, while in the low range of motion suspension stage, a knee joint component 220 of the leg-wheel component 102 may be relaxed, while the remaining joints 210 of the leg-wheel component 102 may be locked. During the low range of motion suspension stage, the leg-wheel component 102 may be configured to handle high-frequency vibrations through the chassis-mounted suspension system 212. According to an exemplary embodiment, when the leg-wheel component 102 is retracted and the low range of motion suspension stage is enabled, the hybrid vehicle 100 may be configured to provide 0 to 5 inches of suspension during wheeled locomotion. It is noted, however, that other amounts of suspension may be incorporated while maintaining the spirit and functionality of the present disclosure.

According to an exemplary embodiment, in the high range of motion suspension stage, the suspension system 212 (e.g., the coil-over suspension) may be disengaged when the leg-wheel component 102 is in an extended or actuated position. For example, the suspension system 212 may be configured to remain with the chassis during the high range of motion suspension stage, and the knee joint 220 may be driven by a motor in order to provide suspension. According to an exemplary embodiment, during the high range of motion suspension stage, the leg-wheel component 102 may be configured to support advanced driving dynamics through the capabilities of the motor at the knee joint 220. According to an exemplary embodiment, when the leg-wheel component 102 is extended and the high range of motion suspension stage is enabled, the hybrid vehicle 100 may be configured to provide 5 to 50 inches of suspension during the walking locomotion. It is noted, however, that other amounts of suspension may be incorporated while maintaining the spirit and functionality of the present disclosure.

Figure 3A:
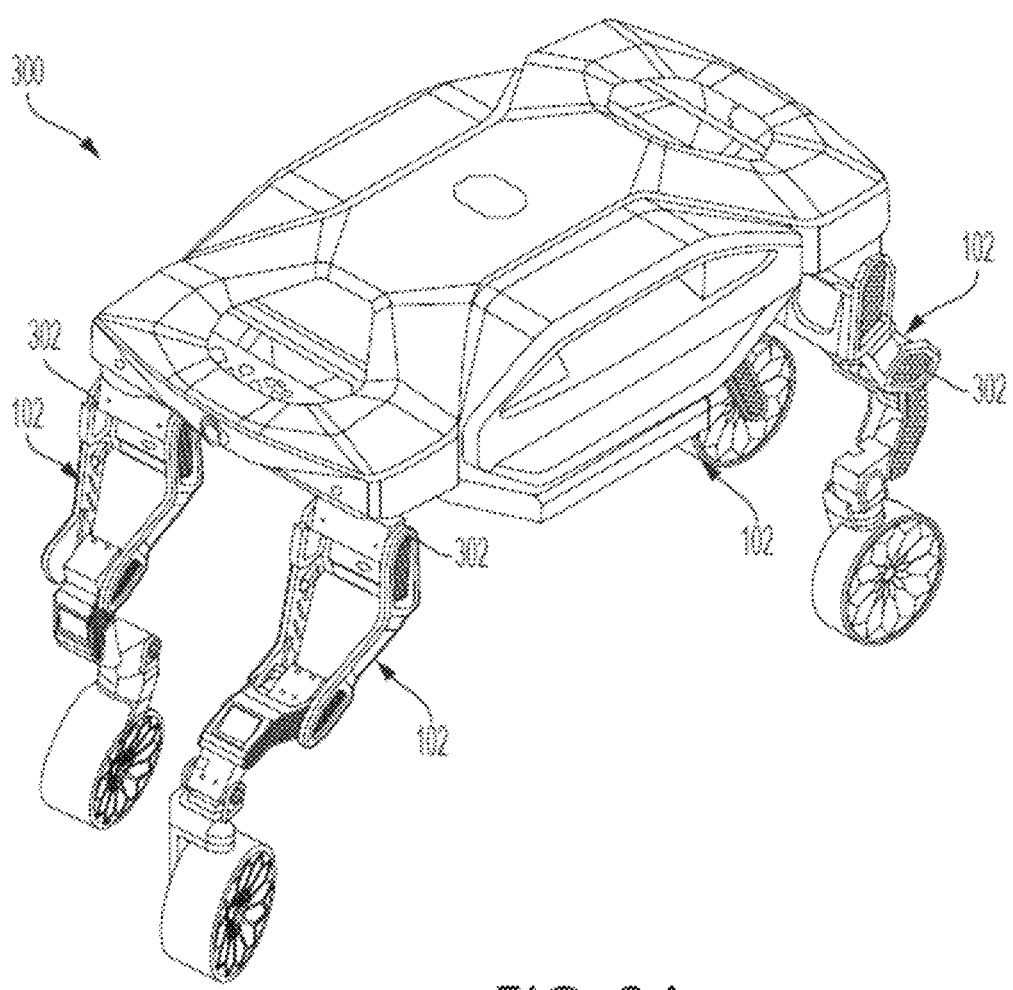
FIGS. 3A through 3C illustrate perspective views of different walking gaits of a hybrid vehicle, according to exemplary embodiments of the present disclosure.
Figure 3B:
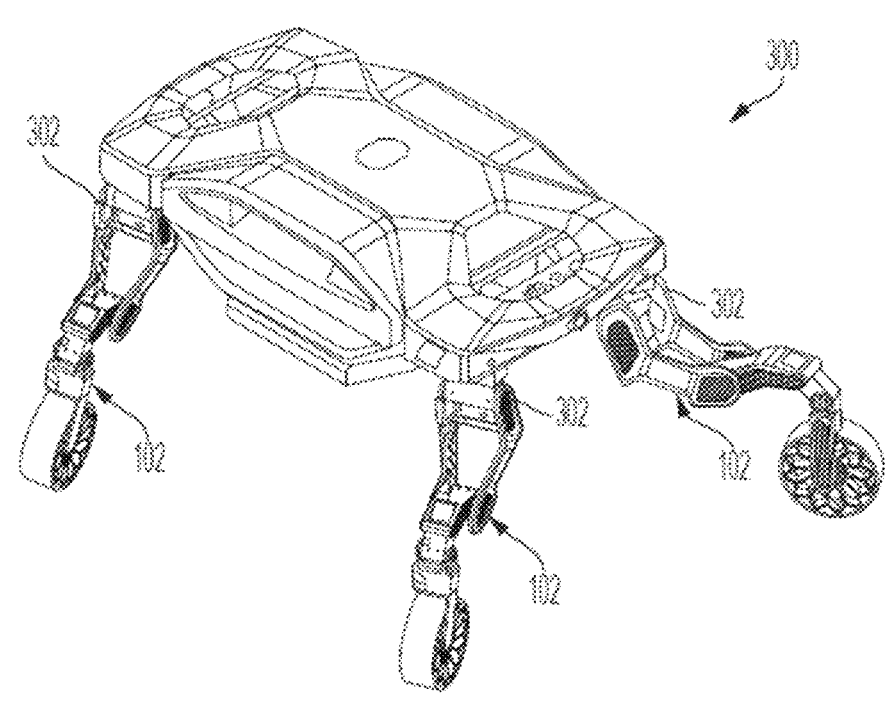
Figure 3C:
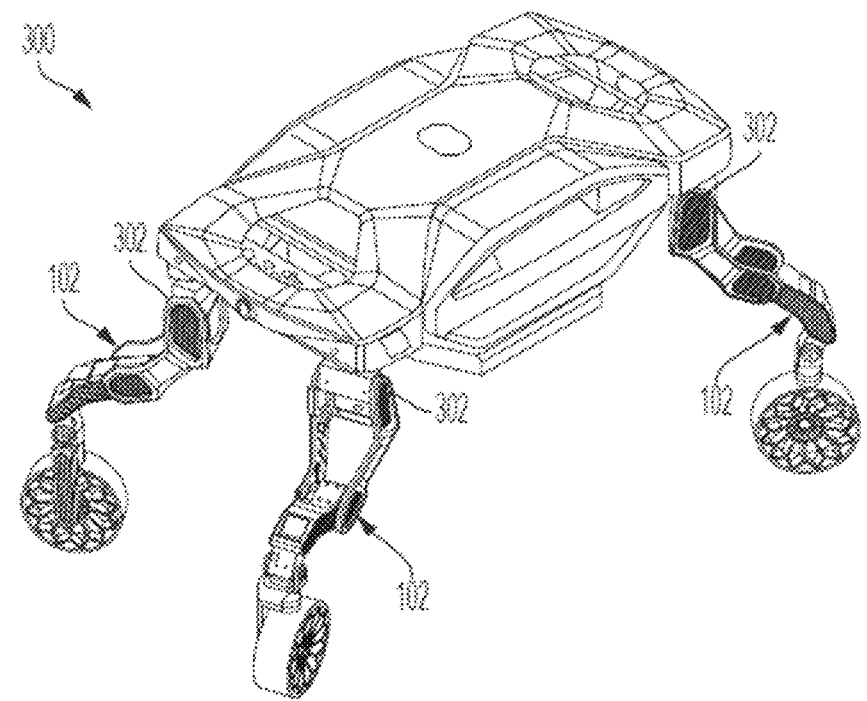

Referring now to FIGS. 3A through 3C, perspective views of different walking gaits of a hybrid vehicle 300 are illustratively depicted, in accordance with exemplary embodiments of the present disclosure.

FIG. 3A illustrates an example view of a hybrid vehicle 300 operating in a mammalian walking gait, according to an exemplary embodiment of the present disclosure. According to an exemplary embodiment, while in the mammalian walking gait, the leg-wheel components 102 are positioned in a support position below a hip section 302, allowing more of the reaction force to translate axially through each link rather than in shear load. In this position, each leg-wheel component 102 may function closer to a singularity, meaning that, for a given change in a joint angle, an end effector will move relatively little. This results in a relatively energy efficient gait which is well suited for moderate terrain over longer periods of time, but may not be as stable because of the narrower stance of the hybrid vehicle 300.

FIG. 3B illustrates an example view of a hybrid vehicle 300 operating in a reptilian walking gait, according to an exemplary embodiment of the present disclosure. According to an exemplary embodiment, the reptilian walking gait may be configured to generally mirror how animals such as a lizard or gecko might traverse terrain. In this position, the reptilian walking gait may rely more heavily on one or more hip abduction motors which may be configured to swing the leg-wheel components 102 around a vertical axis, maintaining a wider stance. The reptilian gait position results in a higher level of stability and control over movement, but is less energy efficient. The wide stance results in high static loads on each motor, making the reptilian gait best suited for walking across extremely unpredictable, rugged terrain for short periods of time.

FIG. 3C illustrates an example view of a hybrid vehicle 300 operating in a hybrid walking gait, according to an exemplary embodiment of the present disclosure. In addition to the reptilian and mammalian gaits, a variety of variants combining various gait strategies are possible. These variants may be generated through optimization techniques and/or discovered through simulation and machine learning. These hybrid gaits allow the hybrid vehicle 300 to optimize around the strengths and weaknesses of the more static bio-inspired gaits, transitioning to a more mammalian-style gait when terrain is gentler and to a more reptilian-style gait in extremely rugged and/or dynamic environments. In dynamic and highly variable terrains, the hybrid vehicle 300 may be configured to constantly adjust its gait based on the environment, battery charge, and/or any number of other factors.

In accordance with the described embodiments, the wheeled locomotion may be available for use in situations where traditional vehicle travel using rolling wheels is available (e.g., roads and highways). The wheeled locomotion is efficient, when available, for conveyance of the hybrid vehicle (e.g., hybrid vehicles 100, 300, 412) between destinations. In some embodiments, the leg-wheel components 102 may be configured to allow for active height adjustment of the hybrid vehicle when transitioning from street use to off-road use.

In the walking locomotion, the hybrid vehicle may be configured to walk up elevations and terrain that may not be surmountable using the wheeled locomotion. In some instances, the walking locomotion may allow for nimble and quiet motion, relative to the wheeled locomotion. The hybrid vehicle may also be capable of moving laterally, allowing for quadrupedal ambulation.

Figure 4:
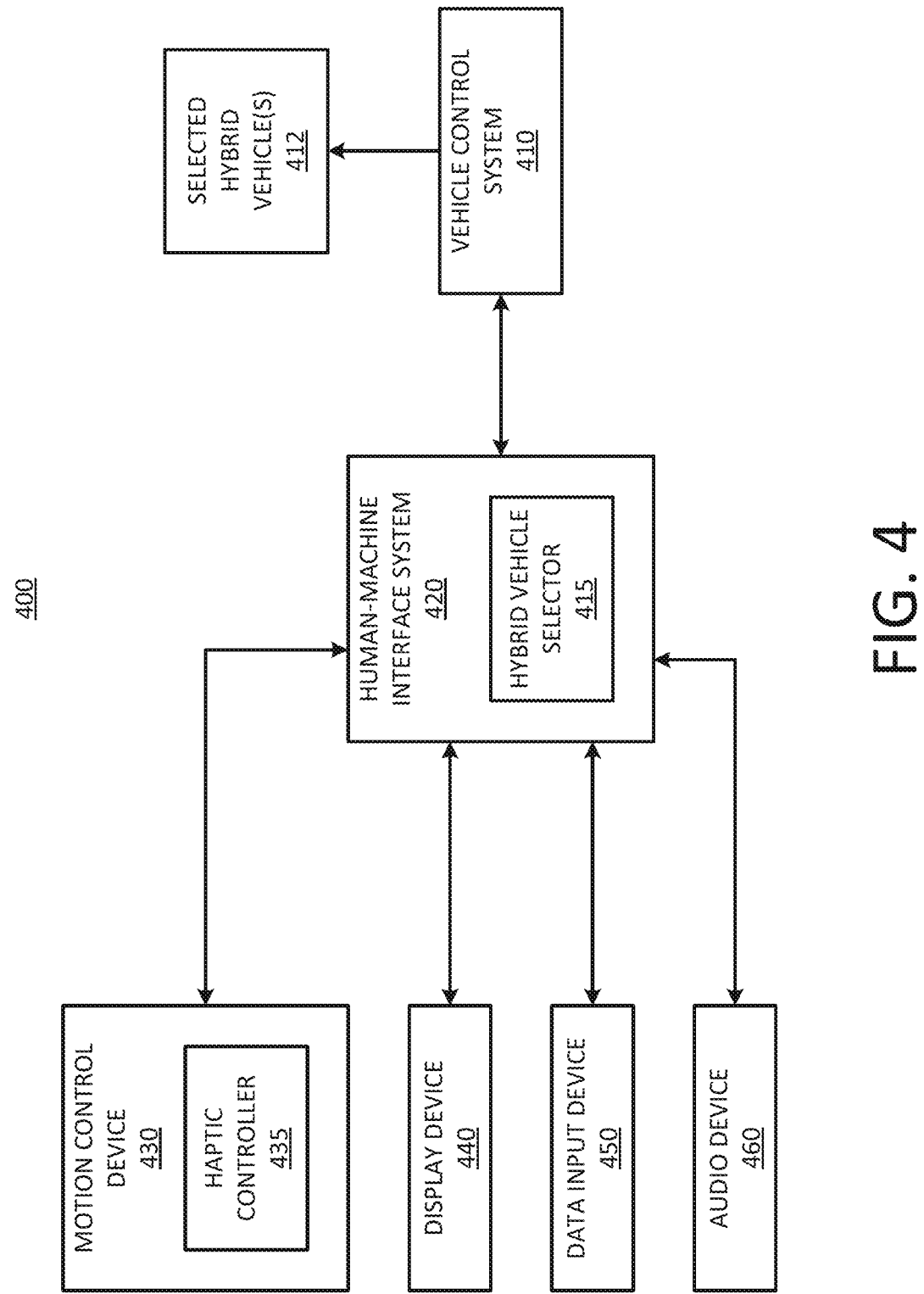
FIG. 4 is a block diagram of a system for providing a stability indication of a hybrid vehicle, according to exemplary embodiments of the present disclosure.

Referring now to FIG. 4, a block diagram of a system 400 for providing a symmetric HMI for controlling one or more hybrid vehicles (e.g., hybrid vehicles 100, 300, 412) is illustratively depicted, in accordance with an exemplary embodiment of the present disclosure. FIG. 4 illustrates one example of a system 400 that can be used in accordance with or to implement various embodiments which are discussed herein.

In controlling the operation of the hybrid vehicle described herein, a number of aspects of the operation are subject to different types of operator control. For example, aspects that may be controlled in operating the hybrid vehicle may comprise the objectives of the hybrid vehicle, the destination of the hybrid vehicle, the speed and direction of travel of the hybrid vehicle, the type of locomotion used (e.g., wheeled, walking, or a combination), the position of legs when in the walking locomotion, controlling the walking gait when in the walking locomotion, etc. Moreover, in accordance with an exemplary embodiment, the system 400 may be configured to enable the selection and control of one or more hybrid vehicles, allowing an operator to select one or more hybrid vehicles for control, and may be configured to control the selected hybrid vehicle(s) using the same HMI, also referred to, e.g., as a "symmetric HMI."

According to an exemplary embodiment, the system 400 may comprise a vehicle control system 410 and a human-machine interface (HMI) system 420. The vehicle control system 410 may be configured to control movement and motion of the hybrid vehicle responsive to one or more received inputs. It should be appreciated that the one or more received inputs may comprise, without limitation, commands received from a human operator, either onboard or remote, hybrid vehicle or remote, from an autonomous control system, and/or a combination thereof. It should be further appreciated that vehicle control system 400 may comprise multiple controllers and/or control modules, and that the functionality of each controller and/or control module may be arranged within one or more different combinations of controllers, resulting in movement of the hybrid vehicle.

The vehicle control system 410 may be configured to receive commands for movement and control of one or more hybrid vehicles and communicate these commands to the one or more hybrid vehicles for operation. These commands may comprise, without limitation, the mission objectives, the vehicle destination, the speed and direction of travel, the locomotion mode (e.g., wheeled, walking, or a combination), motor positions of the leg-wheel components, etc. The leg-wheel components 102 may comprise different walking modes. In addition to the walking locomotion and the rolling locomotion, the wheel motors 214 may be configured to be used while walking in order to create a hybrid wheeled-walking mode of locomotion. Under rolling locomotion, the leg-wheel components 102 may be configured to operate as a high range of motion suspension. It should be appreciated that vehicle control system 410 may be configured to receive commands from a human operator and/or non-human input, such as another hybrid vehicle.

The HMI system 420 may be configured to receive commands from a human operator, either onboard or remote, for controlling the hybrid vehicle via the vehicle control system 410. The HMI system 420 may be configured to receive and present information from the vehicle control system 410 for informing the operator of various information regarding the control and operation of the hybrid vehicle.

The HMI system 420 may be configured to receive commands from various input/output devices, such as, e.g., a motion control device 430, a display device 440, a data input device 450, and/or an audio device 460. The motion control device 430 may comprise, e.g., a steering wheel or a joystick for receiving motion commands from the operator for controlling movement and operation of the hybrid vehicle. It should be appreciated that the motion commands may comprise commands to move to a particular destination, use a particular locomotion mode, move at a certain speed, etc. According to an exemplary embodiment, the motion control device 430 may comprise a haptic controller 435 configured to provide haptic feedback to the operator.

Referring still to FIG. 4, the display device 440 of FIG. 4 may comprise a liquid crystal device (LCD), a light emitting diode display (LED) device, a plasma display device, a touch screen device, and/or other suitable display device suitable for creating graphic images and alphanumeric characters recognizable to a user.

The data input device 450 may comprise a touch device and/or a touch interface for receiving inputs of a human operator. According to an exemplary embodiment, the system 400 may comprise a plurality of data input devices 450 which may be located on one or more external surfaces of the hybrid vehicle. For example, the hybrid vehicle may comprise touch interfaces on each leg-wheel component 102, each portion of each leg-wheel component 102, the chassis, and/or any combination thereof. Touch control may be specific to a particular leg-wheel component 102, and/or may instantiate a central touch control (such as, e.g., for very small or very large vehicles). It should be appreciated that additional information may be conveyed through the touch interface using taps, swipes and/or other known gestures (e.g., for security, actuation, selection, fine control, etc.). Moreover, the touch interfaces may comprise one or more display devices (e.g., a touch screen) capable of displaying information, and/or may be touch only interfaces without an integrated display device.

According to some exemplary embodiments, the data input device 450 may be configured to allow for the explicit control of a visible symbol (e.g., a cursor) on the display device 440 and may be configured to indicate user selections of selectable items displayed on the display device 440. Many implementations of the data input device 450 are known in the art including, e.g., a trackball, a mouse, a touch pad, a touch screen, a joystick, and/or special keys on an alphanumeric input device capable of signaling movement of a given direction or manner of displacement. Alternatively, it will be appreciated that a cursor may be directed and/or activated via input from the alphanumeric input device using the special keys and key sequence commands. According to an exemplary embodiment, the data input device 450 and the display device 440 may be configured to operate cooperatively as a touch screen device.

The audio device 460 may be configured to allow for an audio presentation of information to an operator. According to some exemplary embodiments, the audio device 460 may comprise a speaker. According to some exemplary embodiments, the audio device 460 may comprise a microphone configured for receiving, e.g., voice commands from a user.

According to an exemplary embodiment, the motion control device 430, the display device 440, the data input device 450, and/or the audio device 460, and/or any combination thereof (e.g., user interface selection devices), may be configured to collectively operate to provide a graphical user interface (GUI) under the direction of a processor. The GUI may be configured to enable a user to interact with the system 400 through one or more graphical representations presented on the display device 440 by interacting with one or more of the motion control device 430, the display device 440, the data input device 450, and/or the audio device 460.

According to an exemplary embodiment, the HMI system 420 may comprise a hybrid vehicle selector 415 configured to select one or more hybrid vehicles 412 to control using the HMI system 420. According to an exemplary embodiment, the HMI system 420, for use in hybrid vehicle control, may be configured to provide substantially the same interface for use in controlling one or more hybrid vehicles 412, according to the selection at the hybrid vehicle selector 415, by one or more operators, regardless of whether the one or more hybrid vehicles 412 can accommodate 0, 1, or N passengers, and irrespective of whether the hybrid vehicle 412 is piloted locally and/or remotely.

According to an exemplary embodiment, the HMI system 420 may be configured to provide an intuitive interface to quickly toggle and/or switch between operators for a hybrid vehicle 412. For a passenger hybrid vehicle, the HMI system 420 may be configured to enable an operator to disengage for part of the mission, switching to an alternative operator, either in the vehicle or external to the vehicle. For an unmanned vehicle, the HMI system 420 may be configured to enable control to switch among more than one operator.

According to an exemplary embodiment, the HMI system 420 may be configured to provide an intuitive interface to quickly toggle and/or switch between the hybrid vehicles being controlled (e.g., switching control from a first vehicle to a second vehicle). The HMI system 420 may be configured to provide an interface for undertaking group control of multiple hybrid vehicles. For example, there may be instances where multiple vehicles are collaborating on a mission, and the use of a common and symmetric HMI allows an operator to seamlessly switch control to a different vehicle or groups of vehicles within the fleet of vehicles. According to an exemplary embodiment, the HMI system 420 may be configured to provide for group control of a plurality of vehicles (e.g., UAV flocks, UGV herds, and/or USV schools).

According to an exemplary embodiment, the HMI system 420 may be configured to be implemented within a tablet, a phone, and/or other primarily touchscreen interface. In addition to the touchscreen, a camera may be used to recognize sign language commands, and/or a microphone may be used to accept voice instructions. A virtual reality headset and/or smart glasses may optionally be used to display environmental conditions and/or operating parameters. Body worn elements may be used to provide haptic feedback and/or control inputs. According to an exemplary embodiment, the HMI system 420 may be configured to be operated according to a control hierarchy for establishing operator control (e.g., which operators supersede other operators) and resolving conflicts (e.g., when multiple vehicles request one operator, or multiple operators request one vehicle). For example, when used in a crewed hybrid vehicle, the HMI system 420 may be configured to be implemented within a removable device, such as, e.g., a tablet, that may be used onboard by an operator and/or may be removed for remote use by the same or different operator.

Figure 5:
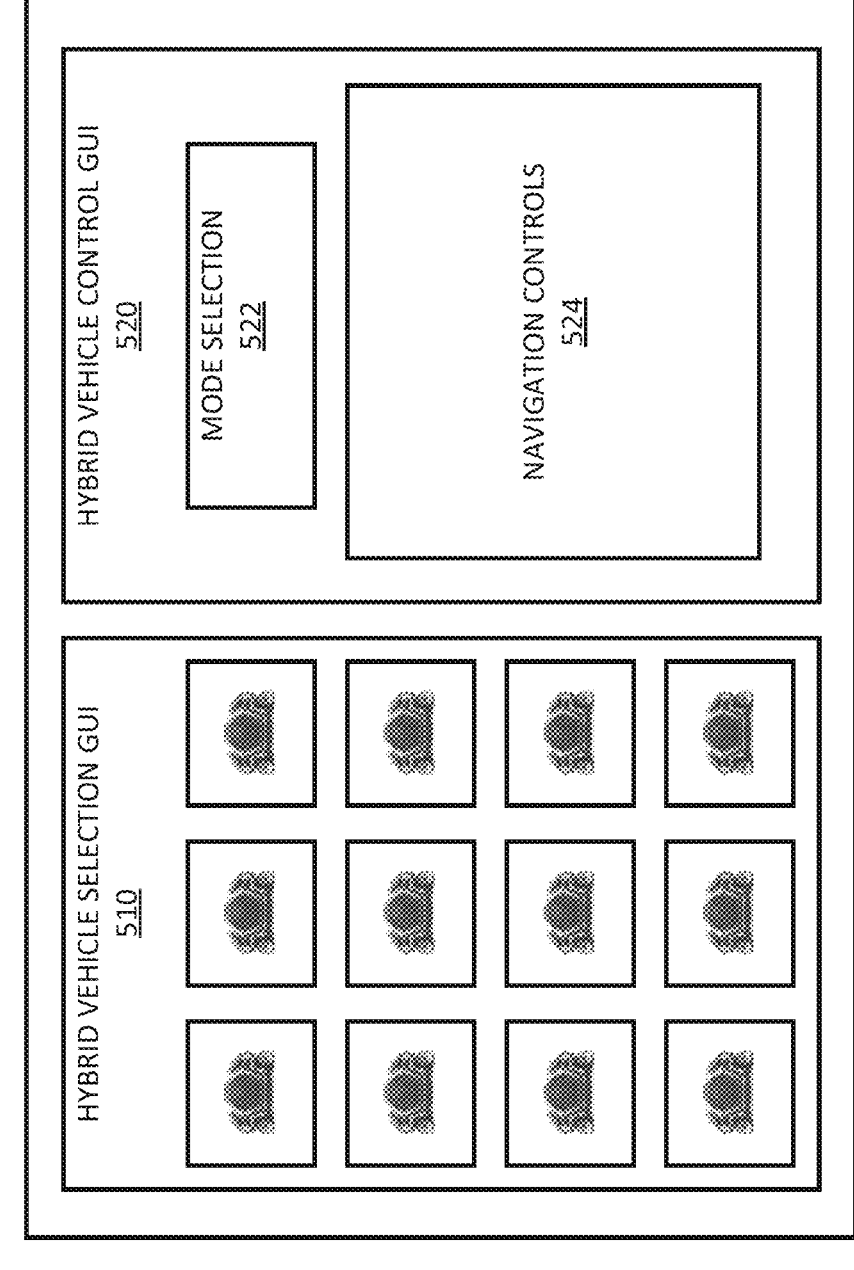
FIG. 5 is an example graphical user interface (GUI) for receiving a hybrid vehicle selection at a symmetric human-machine interface (HMI), according to an exemplary embodiment of the present disclosure.

Referring now to FIG. 5, an example graphical user interface (GUI) 500 for receiving a hybrid vehicle selection at a symmetric HMI is illustratively depicted, in accordance with an exemplary embodiment of the present disclosure.

According to an exemplary embodiment, the GUI 500 may comprise hybrid vehicle selection GUI 510 and a hybrid vehicle control GUI 520. It should be appreciated that the hybrid vehicle selection GUI 510 and the hybrid vehicle control GUI 520 may be configured to be displayed on different screens of GUI 500, and/or multiple screens of GUI 510, of which the illustrated example GUI 500 in FIG. 5 is just one possible implementation.

According to an exemplary embodiment, the hybrid vehicle selection GUI 510 may comprise one or more icons configured for enabling the selection of one or more hybrid vehicles (e.g., hybrid vehicles 100, 300, 412) under control of the same HMI system. It should be appreciated that any number of hybrid vehicles may be selected for control, and that the selection of one hybrid vehicle or multiple hybrid vehicles may cause the hybrid vehicle control GUI 520 to provide different control options. For instance, certain controls may be enabled and/or disabled for multiple hybrid vehicle control rather than individual hybrid vehicle control.

According to an exemplary embodiment, the hybrid vehicle control GUI 520 may be configured to provide an interface for controlling movement and navigation of the selected one or more hybrid vehicles. For example, as illustrated in FIG. 5, the hybrid vehicle control GUI 520 may comprise a mode selection 522 and one or more navigation controls 524. According to an exemplary embodiment, the mode selection 522 may be configured to receive an input selecting one of wheeled navigation and walking navigation. According to an exemplary embodiment, the one or more navigation controls 524 may be configured to enable the GUI 500 to navigate the selected one or more hybrid vehicles. According to an exemplary embodiment, the one or more navigation controls 524 may be dependent on a selected mode of the mode selection 522.

It should be appreciated that the GUI 500 may be configured to provide a same interface and user experience to the operator, regardless of the selected hybrid vehicle(s). That is, the HMI may be symmetric across all possible vehicle selections, providing operators with a consistent control experience. The described embodiments provide a symmetric HMI capable of control of hybrid vehicles, both passenger occupied hybrid vehicles and uncrewed hybrid vehicles. Accordingly, according to an exemplary embodiment, only a single HMI may need to be developed and maintained by engineering and then learned by operators for both crewed and uncrewed hybrid vehicles. This saves engineering time as well as user training time. It is particularly useful in the context of the described hybrid vehicle capable of wheeled and walking locomotion in which multiple drive modes may be available.

According to an exemplary embodiment, the GUI 500 may be configured to enable an operator to quickly select the hybrid vehicle and assume control over another operator. For a passenger hybrid vehicle, the symmetric HMI may be configured to enable an operator to disengage for part of a mission, switching to an alternative operator either in the vehicle or external to the vehicle. For an unmanned vehicle, the symmetric HMI may be configured to enable control to switch among more than one operator.

According to an exemplary embodiment, the GUI 500 may be configured to enable quick toggling or switching between hybrid vehicles being controlled (e.g., switching control from a first vehicle to a second vehicle). According to an exemplary embodiment, the GUI 500 may be configured to allow for undertaking group control of multiple hybrid vehicles. For example, there may be instances where multiple vehicles are collaborating on a mission, and the use of a common and symmetric HMI allows an operator to seamlessly switch control to a different vehicle or groups of vehicles within a fleet of vehicles. According to an exemplary embodiment, the symmetric HMI may be configured to provide for group control of a plurality of vehicles (e.g., UAV flocks, UGV herds, and/or USV schools).

According to an exemplary embodiment, the GUI 500 may be configured to be implemented within a tablet, a phone, and/or other primarily touchscreen interface. In addition to the touchscreen, the camera may be used to recognize sign language commands, and/or the microphone may be used to accept voice instructions. The virtual reality headset and/or the smart glasses may optionally be used to display environmental conditions or operating parameters. The body worn elements may be used to provide haptic feedback and/or control inputs. According to an exemplary embodiment, the symmetric HMI may be operated according to a control hierarchy for establishing operator control (e.g., which operators supersede other operators) and resolving conflicts (e.g., when multiple vehicles request one operator, or multiple operators request one vehicle).

Figure 6:
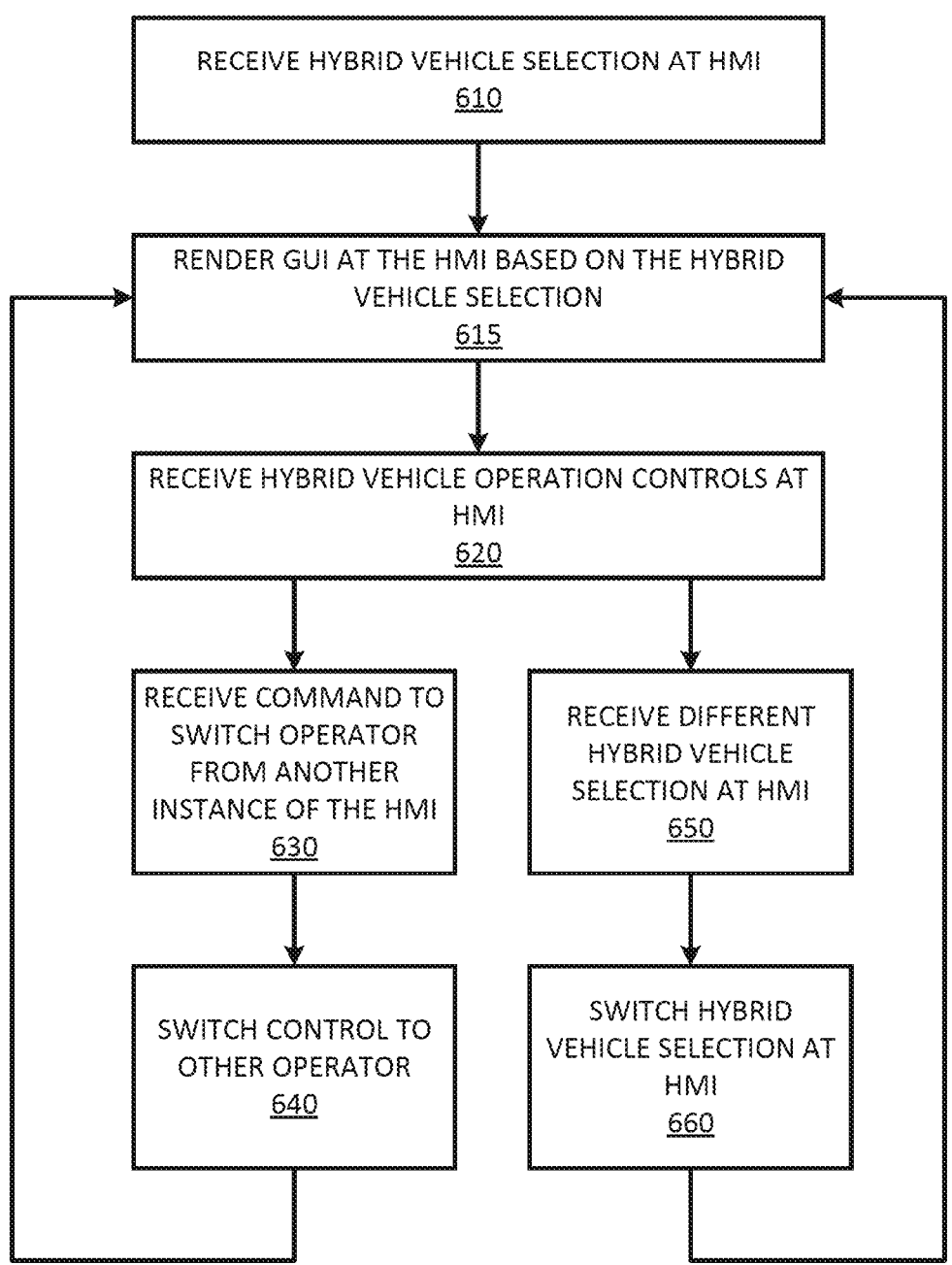
FIG. 6 is a flow diagram illustrating an example method for controlling a hybrid vehicle at a symmetric HMI, according to an exemplary embodiment of the present disclosure.

Referring now to FIG. 6, a flow diagram illustrating an example method 600 for controlling a hybrid vehicle at a symmetric HMI is illustratively depicted, in accordance with an exemplary embodiment of the present disclosure.

Procedures of this method 600 may be described with reference to elements and/or components of various figures described herein. It is appreciated that in some embodiments, the procedures may be performed in a different order than described, that some of the described procedures may not be performed, and/or that one or more additional procedures to those described may be performed. The flow diagram includes some procedures that, in various embodiments, are carried out by one or more processors (e.g., a host processor or a sensor processor) under the control of computer-readable and computer-executable instructions that are stored on non-transitory computer-readable storage media (e.g., computing device 700 of FIG. 7). It is further appreciated that one or more procedures described in the flow diagram may be implemented in hardware, or a combination of hardware with firmware and/or software.

At 610, a hybrid vehicle selection may be received at an HMI (e.g., HMI system 420 of FIG. 4). According to an exemplary embodiment, the hybrid vehicle selection may be received at a GUI (e.g., GUI 500 of FIG. 5) of the HMI. It should be appreciated that any number of available hybrid vehicles may be selected at the HMI.

At 615, the GUI may be rendered at the HMI based on, e.g., the hybrid vehicle selection. It should be appreciated that the HMI may be configured to provide a same interface and user experience to the operator, regardless of the selected hybrid vehicle(s). That is, the HMI may be symmetric across all possible vehicle selections, providing operators with a consistent control experience.

At 620, commands dictating operation and movement (e.g., mode selection, vehicle navigation commands, speed, direction, etc.) of the selected hybrid vehicles may be received at the HMI.

According to an exemplary embodiment, at 630, a command to switch the operator of at least one of the selected hybrid vehicles may be received at another instance of the HMI. According to an exemplary embodiment, the symmetric HMI may be operated according to a control hierarchy for establishing operator control (e.g., which operators supersede other operators) and resolving conflicts (e.g., when multiple vehicles request one operator, or multiple operators request one vehicle). At 640, control of the hybrid vehicle may be switched to another operator, allowing the other operator full control of the hybrid vehicle using another instance of the GUI of the HMI. According to an exemplary embodiment, method 600 may then proceed to 615.

According to an exemplary embodiment, at 650, a different vehicle selection may be received at the HMI. For instance, where an operator is controlling multiple hybrid vehicles, the operator may select one of the hybrid vehicles for control so that the hybrid vehicle may undertake a specific task. At 660, the hybrid vehicle selection may be switched at the HMI, allowing the operator full control of the newly selected hybrid vehicle. According to an exemplary embodiment, method 600 may then proceed to 615. According to an exemplary embodiment, the GUI may be updated to reflect the new selection, allowing for operation of the hybrid vehicle using the available vehicle controls.

Figure 7:
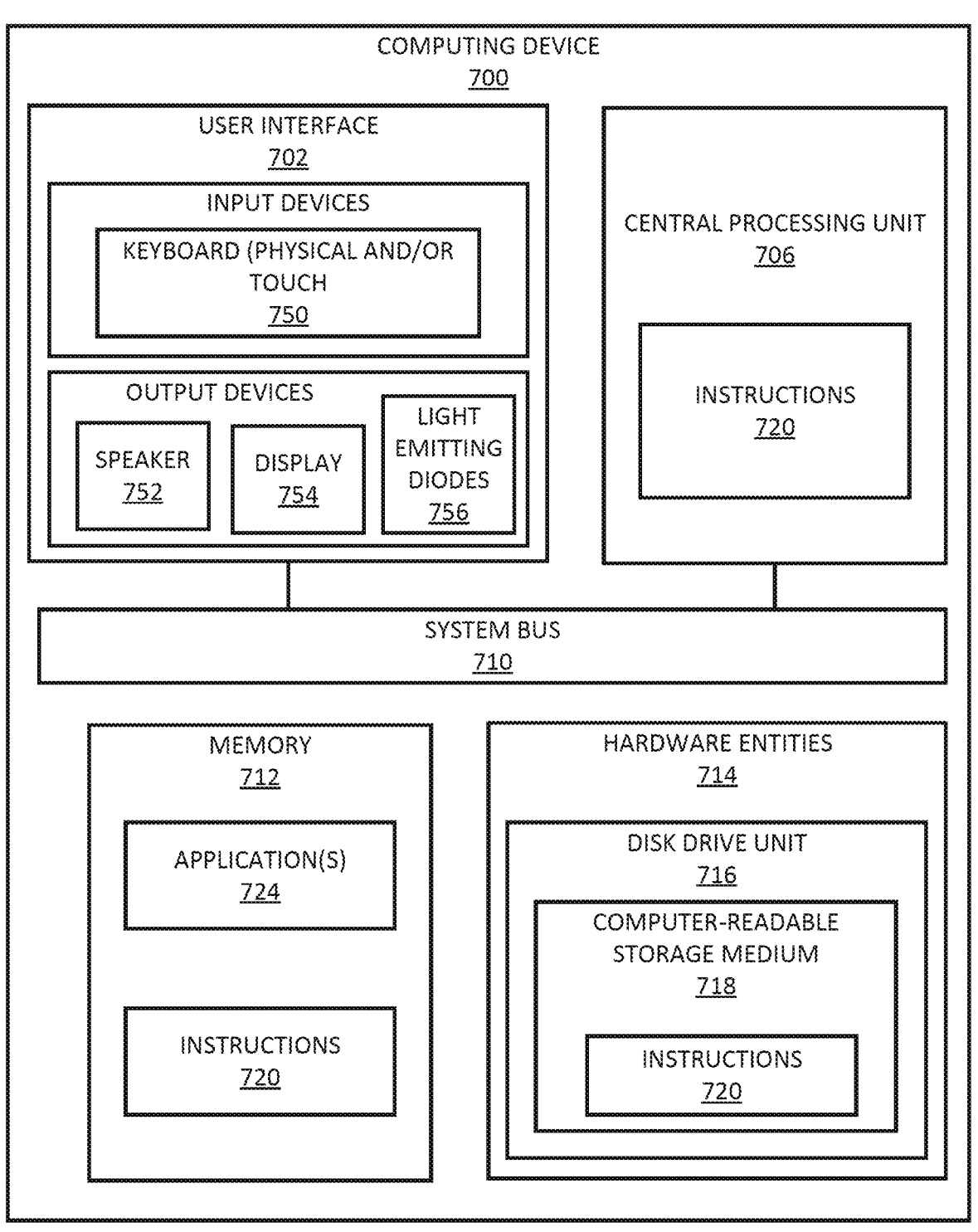
FIG. 7 illustrates example elements of a computing device, according to an exemplary embodiment of the present disclosure.

Referring now to FIG. 7, an illustration of an example architecture for a computing device 700 is provided. According to an exemplary embodiment, one or more functions of the present disclosure may be implemented by a computing device such as, e.g., computing device 700 or a computing device similar to computing device 700.

The hardware architecture of FIG. 7 represents one example implementation of a representative computing device configured to perform one or more methods and means for controlling a vehicle capable of locomotion using both walking motion and rolling traction using an HMI, as described herein. As such, the computing device 700 of FIG. 7 implements at least a portion of the method(s) described herein (e.g., method 600) and/or implements at least a portion of the functions of the system(s) described herein (e.g., system 400 of FIG. 4).

Some or all components of the computing device 700 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 7, the computing device 700 may comprise a user interface 702, a Central Processing Unit ("CPU") 706, a system bus 710, a memory 712 connected to and accessible by other portions of computing device 700 through system bus 710, and hardware entities 714 connected to system bus 710. The user interface may comprise input devices and output devices, which may be configured to facilitate user-software interactions for controlling operations of the computing device 700. The input devices may comprise, but are not limited to, a physical and/or touch keyboard 740. The input devices may be connected to the computing device 700 via a wired or wireless connection (e.g., a Bluetooth® connection). The output devices may comprise, but are not limited to, a speaker 742, a display 744, and/or light emitting diodes 746.

At least some of the hardware entities 714 may be configured to perform actions involving access to and use of memory 712, which may be a Random Access Memory (RAM), a disk driver and/or a Compact Disc Read Only Memory (CD-ROM), among other suitable memory types. Hardware entities 714 may comprise a disk drive unit 716 comprising a computer-readable storage medium 718 on which may be stored one or more sets of instructions 720 (e.g., programming instructions such as, but not limited to, software code) configured to implement one or more of the methodologies, procedures, or functions described herein. The instructions 720 may also reside, completely or at least partially, within the memory 712 and/or within the CPU 706 during execution thereof by the computing device 700.

The memory 712 and the CPU 706 may also constitute machine-readable media. The term "machine-readable media", as used here, refers to a single medium or multiple media (e.g., a centralized or distributed database, and/or associated caches and servers) that store the one or more sets of instructions 720. The term "machine-readable media", as used here, also refers to any medium that is capable of storing, encoding or carrying a set of instructions 720 for execution by the computing device 700 and that cause the computing device 700 to perform any one or more of the methodologies of the present disclosure.

Figure 8:
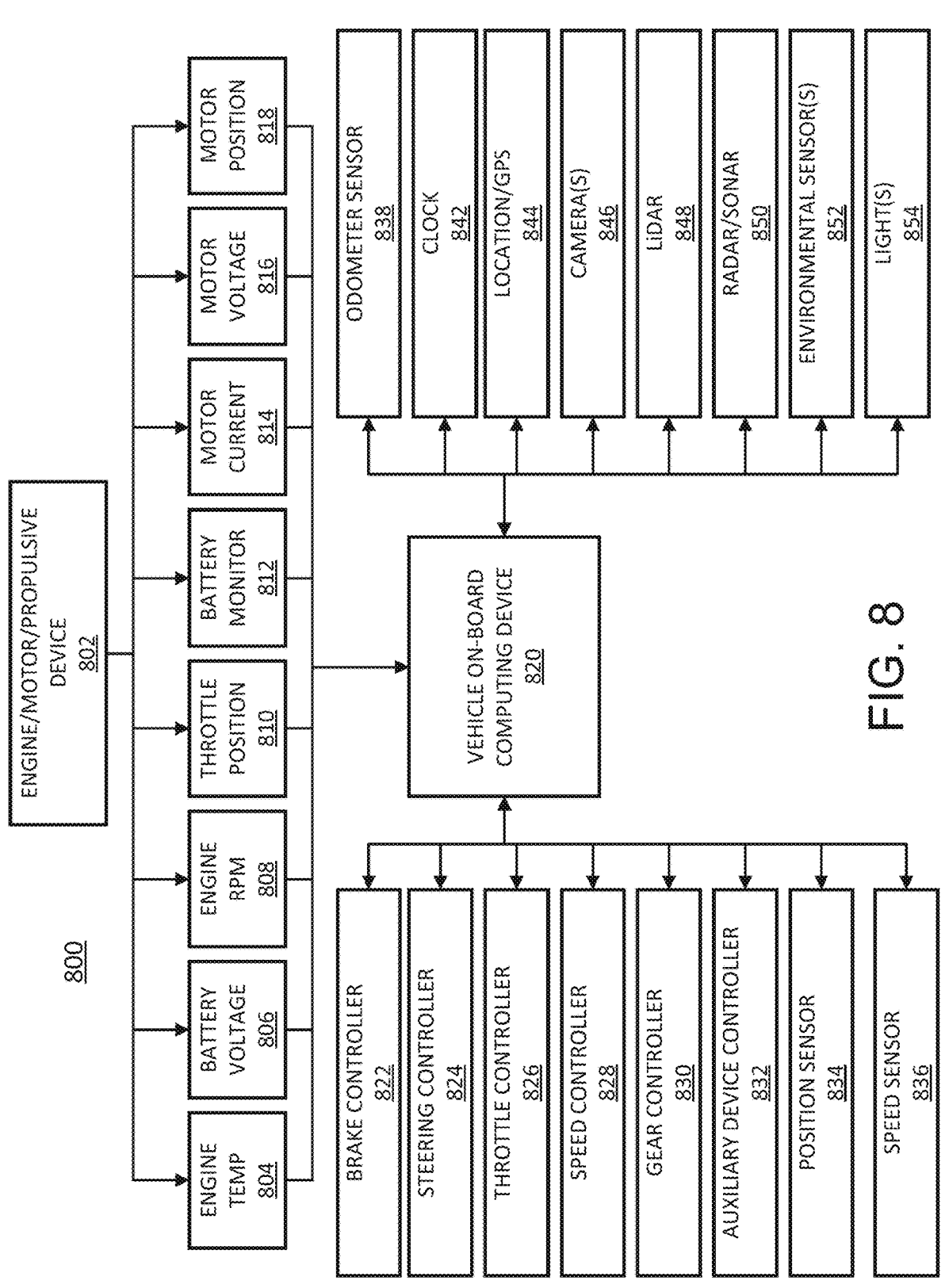
FIG. 8 illustrates an example architecture of a vehicle, according to an exemplary embodiment of the present disclosure.

Referring now to FIG. 8, an example vehicle system architecture 800 for a vehicle is provided, in accordance with an exemplary embodiment of the present disclosure.

Hybrid vehicles 100, 300, and 412 may have the same or similar system architecture as that shown in FIG. 8. Thus, the following discussion of vehicle system architecture 800 is sufficient for understanding one or more components of hybrid vehicles 100, 300, and 412.

As shown in FIG. 8, the vehicle system architecture 800 may comprise an engine, motor or propulsive device (e.g., a thruster) 802 and various sensors 804-818 for measuring various parameters of the vehicle system architecture 800. In gas-powered or hybrid vehicles having a fuel-powered engine, the sensors 804-818 may comprise, for example, an engine temperature sensor 804, a battery voltage sensor 806, an engine Rotations Per Minute (RPM) sensor 808, and/or a throttle position sensor 810. If the vehicle is an electric or hybrid vehicle, then the vehicle may comprise an electric motor, and accordingly may comprise sensors such as a battery monitoring system 812 (to measure current, voltage and/or temperature of the battery), motor current 814 and voltage 816 sensors, and motor position sensors such as resolvers and encoders 818.

Operational parameter sensors that are common to both types of vehicles may comprise, for example: a position sensor 834 such as an accelerometer, gyroscope and/or inertial measurement unit; a speed sensor 836; and/or an odometer sensor 838. The vehicle system architecture 800 also may comprise a clock 842 that the system uses to determine vehicle time and/or date during operation. The clock 842 may be encoded into the vehicle on-board computing device 820, it may be a separate device, or multiple clocks may be available.

The vehicle system architecture 800 also may comprise various sensors that operate to gather information about the environment in which the vehicle is traveling. These sensors may comprise, for example: a location sensor 844 (for example, a Global Positioning System (GPS) device); object detection sensors such as one or more cameras 846; a LiDAR sensor system 848; and/or a RADAR and/or a sonar system 850. The sensors also may comprise environmental sensors 852 such as, e.g., a humidity sensor, a precipitation sensor, a light sensor, and/or ambient temperature sensor. The object detection sensors may be configured to enable the vehicle system architecture 800 to detect objects that are within a given distance range of the vehicle in any direction, while the environmental sensors 852 may be configured to collect data about environmental conditions within the vehicle's area of travel. According to an exemplary embodiment, the vehicle system architecture 800 may comprise one or more lights 854 (e.g., headlights, flood lights, flashlights, etc.).

During operations, information may be communicated from the sensors to an on-board computing device 820 (e.g., computing device 700 of FIG. 7). The on-board computing device 820 may be configured to analyze the data captured by the sensors and/or data received from data providers and may be configured to optionally control operations of the vehicle system architecture 800 based on results of the analysis. For example, the on-board computing device 820 may be configured to control: braking via a brake controller 822, direction via a steering controller 824; speed and acceleration via a throttle controller 826 (in a gas-powered vehicle) or a motor speed controller 828 (such as a current level controller in an electric vehicle); a differential gear controller 830 (in vehicles with transmissions); and/or other controllers. The brake controller 822 may comprise a pedal effort sensor, pedal effort sensor, and/or simulator temperature sensor, as described herein.

Geographic location information may be communicated from the location sensor 844 to the on-board computing device 820, which may then access a map of the environment that corresponds to the location information to determine known fixed features of the environment such as streets, buildings, stop signs and/or stop/go signals. Captured images from the cameras 846 and/or object detection information captured from sensors such as LiDAR 848 may be communicated from those sensors to the on-board computing device 820. The object detection information and/or captured images may be processed by the on-board computing device 820 to detect objects in proximity to the vehicle. Any known or to be known technique for making an object detection based on sensor data and/or captured images may be used in the embodiments disclosed in this document.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A method for operating a hybrid vehicle, comprising:
   receiving, at a human-machine interface (HMI) comprising a processor and a memory, a selection of at least one hybrid vehicle of a plurality of hybrid vehicles, wherein each hybrid vehicle, of the plurality of hybrid vehicles, is configured to perform wheeled and walking locomotion;
   rendering, at the HMI, a graphical user interface (GUI) based on the selection of the at least one hybrid vehicle; and
   receiving, at the HMI, one or more commands dictating an operation of one or more hybrid vehicles of the selected at least one hybrid vehicle,
   controlling, based on the received one or more commands, movement of the selected at least one hybrid vehicle;
   receiving, at another instance of the HMI comprising another processor and another memory, a command to switch an operator of the at least one hybrid vehicle to another operator;
   determining that a control hierarchy for establishing operator control is satisfied; and
   switching control of the selected at least one hybrid vehicle to the another operator in response to determining that the control hierarchy for establishing operator control is satisfied.

2. The method of claim 1, further comprising receiving, at the HMI, a selection of a different hybrid vehicle of the at least one hybrid vehicle.

3. The method of claim 1, wherein the receiving, at the HMI, the one or more commands comprises receiving the one or more commands via one or more of:
   a motion control device;
   a display device;
   a data input device; and
   an audio device.

4. The method of claim 2, further comprising:
   updating the selection of the at least one hybrid vehicle to the different hybrid vehicle, contingent upon satisfaction of a control hierarchy for establishing operator control; and
   updating the GUI based on the selection of the different hybrid vehicle.

5. A system for operating a hybrid vehicle, comprising:
   a human-machine interface (HMI), comprising a processor and a memory,
      wherein the processor is configured to:
         receive, at the HMI, a selection of at least one hybrid vehicle of a plurality of hybrid vehicles, wherein each hybrid vehicle of the plurality of hybrid vehicles is configured to perform wheeled and walking locomotion;
         render, at the HMI, a graphical user interface (GUI) based on the selection of the at least one hybrid vehicle; and
         receive, at the HMI, one or more commands configured to dictate an operation of one or more hybrid vehicles of the selection of the at least one hybrid vehicle;
   a vehicle control system including another processor and configured to control movement of the selected one or more hybrid vehicles based on the received one or more commands, and
   another instance of the HMI comprising another processor and another memory, wherein the processor of the other HMI is configured to:
      receive a command to switch an operator of the at least one hybrid vehicle to another operator;
      determine that a control hierarchy for establishing operator control is satisfied; and
      switch control of the selected at least one hybrid vehicle to the another operator in response to determining that the control hierarchy for establishing operator control is satisfied.

6. The system of claim 5, wherein each hybrid vehicle, of the plurality of hybrid vehicles, comprises:
   a chassis;
   a plurality of leg-wheel components coupled to the chassis, wherein the plurality of leg-wheel components are configured to be collectively operable to provide wheeled locomotion and walking locomotion;
   at least one sensor configured to receive one or more external commands during a supplementary control mode; and
   a vehicle control system configured to control a hybrid vehicle to effectuate the one or more external commands.

7. The system of claim 5, wherein the processor is further configured to receive, at the HMI, a selection of a different hybrid vehicle of the at least one hybrid vehicle.

8. The system of claim 7, wherein the processor is further configured to:
   update the selection of the at least one hybrid vehicle to the different hybrid vehicle; and
   update the GUI based on the selection of the different hybrid vehicle.

9. A non-transitory computer-readable medium for operating a hybrid vehicle, comprising programming instructions stored thereon that when executed on a processor, cause the processor to perform operations comprising:

receiving, at a human machine interface (HMI), a selection of at least one hybrid vehicle of the plurality of hybrid vehicles, wherein each hybrid vehicle, of the plurality of hybrid vehicles, is configured to perform wheeled and walking locomotion;

rendering, at the HMI, a graphical user interface (GUI) based on the selection of the at least one hybrid vehicle;

receiving, at the HMI, one or more commands dictating an operation of one or more hybrid vehicles of the selection of the at least one hybrid vehicle;

controlling, based on the received one or more commands, movement of the selected at least one hybrid vehicle;

receiving, at another instance of the HMI, a command to switch an operator of the at least one hybrid vehicle to another operator;

determining that a control hierarchy for establishing operator control is satisfied; and switching control of the selected at least one hybrid vehicle to the another operator in response to determining that the control hierarchy for establishing operator control is satisfied.

10. The non-transitory computer-readable medium of claim 9, wherein each hybrid vehicle, of the plurality of hybrid vehicles, comprises:

a chassis;

a plurality of leg-wheel components coupled to the chassis, wherein the plurality of leg-wheel components are configured to be collectively operable to provide wheeled locomotion and walking locomotion;

at least one sensor configured to receive one or more external commands during a supplementary control mode; and a vehicle control system configured to control a hybrid vehicle to effectuate the one or more external commands.

11. The non-transitory computer-readable medium of claim 9, wherein the programming instructions, when executed by the processor, are further configured to receive, at the HMI, a selection of a different hybrid vehicle of the at least one hybrid vehicle.

12. The non-transitory computer-readable medium of claim 11, wherein the programming instructions, when executed by the processor, are further configured to:

update the selection of the at least one hybrid vehicle to the different hybrid vehicle; and update the GUI based on the selection of the different hybrid vehicle.

* * * * *